United States Patent [19]

Hayashi et al.

[11] Patent Number: 5,390,290
[45] Date of Patent: Feb. 14, 1995

[54] PRINTING METHOD FOR USE WITH DOT PRINTER

[75] Inventors: Mikio Hayashi; Hiroshi Sato; Masahiro Nishida; Keiichiro Takahashi, all of Tokyo, Japan

[73] Assignee: Seikosha Co., Ltd., Tokyo, Japan

[21] Appl. No.: 174,586

[22] Filed: Dec. 28, 1993

Related U.S. Application Data

[60] Continuation of Ser. No. 985,518, Dec. 2, 1992, which is a continuation of Ser. No. 697,126, May 8, 1991, which is a division of Ser. No. 622,991, Dec. 6, 1990, Pat. No. 5,208,762.

Foreign Application Priority Data

Dec. 6, 1989 [JP] Japan .................. 1-316964

[51] Int. Cl.$^6$ ............................................. G06F 15/00
[52] U.S. Cl. ........................................ 395/109; 395/154
[58] Field of Search ............... 395/101, 102, 108, 109, 395/117; 400/121; 346/154, 75; 358/431, 451, 428

[56] References Cited

U.S. PATENT DOCUMENTS

| | | | |
|---|---|---|---|
| 4,216,480 | 8/1980 | Buehner et al. | 346/75 |
| 5,016,195 | 5/1991 | Warp | 395/117 |

FOREIGN PATENT DOCUMENTS

| | | |
|---|---|---|
| 0234018 | 9/1987 | European Pat. Off. |
| 0264265 | 4/1988 | European Pat. Off. |
| 0326295 | 8/1989 | European Pat. Off. |
| 0331033 | 9/1989 | European Pat. Off. |

OTHER PUBLICATIONS

Patent Abstracts of Japan, vol. 13, No. 183 (M-820)(3531). 28 Apr. 1989, & JP-A-1 104 049 (Oki Electric Ind Co Ltd) 18 Jan. 1989.
Hewlett Packard Journal, vol. 39, No. 5, Oct. 1989, Palo Alto, Calif., USA pp. 76–80, May, J. D. et al., "Data to Dots in the HP DeskJet Printer".

Primary Examiner—Arthur G. Evans
Attorney, Agent, or Firm—Jordan and Hamburg

[57] ABSTRACT

A printing method to increase the printing speed of a dot printer. Before printing on the basis of the dot data representative of an original dot pattern showing fonts, graphics and the like, the original dot pattern is converted by converting M (M≧3) dots successive in the line direction into N (M>N≧2, M≠2N) dots. Then, printing is performed on the basis of the thus converted dot data. In a modification, conversion is performed by converting each dot into n (n≧2) successive intermediate dots in the line direction and when 2n or more intermediate dots are successive, selecting every m {(2n−1)≧m≧(n+1)}-th intermediate dot. In another modification, pattern conversion is effected by converting each dot into n (n≧2) successive intermediate dots, in a zone where printing is possible at the same dot interval as that of the original dot pattern, selecting only dots out of the intermediate dots that are arranged at the same dot interval as that of the original dot pattern, and in the other zone, selecting every m {(2n−1)≧m≧(n+1)}-th intermediate dot.

8 Claims, 9 Drawing Sheets

PRINTING METHOD FOR USE WITH DOT PRINTER

This application is a continuation of application Ser. No. 07/985,518 filed Dec. 2, 1992, which is a continuation of Ser. No. 07/697,126 filed May 8, 1991, which is a division of Ser. No. 07/622,991 filed Dec. 6, 1990, now U.S. Pat. No. 5,208,762.

BACKGROUND OF THE INVENTION

Hitherto, to attain high-speed printing using a wire dot printer, for example, a method was known (see, for example, Japanese Patent Laid-Open No. 60-73852) which comprised the steps of generating a secondary dot pattern from an original dot pattern showing fonts and the like by removing every other dot from the original dot pattern, and scanning a print head on the basis of the secondary dot pattern at a speed 2 times faster than usual to attain printing.

According to the method comprising the steps of converting the original dot pattern into the secondary dot pattern by removing every other dot out of the original dot pattern and performing printing on the basis of the secondary dot pattern, although the printing speed is doubled, the thus printed dot pattern is significantly distorted as compared with the original dot pattern, resulting in a poor quality of printing.

SUMMARY OF THE INVENTION

It is an object of the present invention to provide a printing method for use with a dot printer which can increase the printing speed with little deterioration in printing quality.

To accomplish the foregoing object, the present invention provides a printing method which comprises the steps of receiving the dot data representative of an original dot pattern showing fonts, graphics and the like; converting the pattern of the original dot pattern by converting M ($M \geq 3$) successive dots in the line direction to N ($M > N \geq 2$, $M \neq 2N$) dots; and performing printing on the basis of the thus converted dot data. Specifically, printing is performed while scanning a print head at a speed faster than usual, or printing is performed while scanning the print head at a speed M/N times faster than usual. In a modification, the foregoing object can also be accomplished by a printing method which comprises the steps of receiving the dot data representative of an original dot pattern showing fonts, graphics and the like; converting the pattern of the original dot pattern by converting each dot to n ($n \geq 2$) intermediate successive dots in the line direction and when 2n or more intermediate dots are successive, selecting every m $\{(2n-1) \geq m \geq (n+1)\}$-th intermediate dot; and performing printing on the basis of the thus converted dot data. Specifically, printing is performed while scanning a print head at a speed faster than usual. In another modification, the foregoing object can also be accomplished by a printing method which comprises the steps of receiving the dot data representative of an original dot pattern showing fonts, graphics and the like; when printing is to be performed at a speed faster than the moving speed of a print head attained when the original dot pattern is printed, converting the pattern of the original dot pattern by converting each dot into n ($n \geq 2$) successive intermediate dots, in a zone where printing is possible at the same dot interval as that of the original dot pattern, selecting only dots from the intermediate dots that are arranged at the same dot interval as that of the original dot pattern, and in the other zone, selecting every m $\{(2n-1) \geq m \geq (n+1)\}$-th intermediate dot; and performing printing on the basis of the thus converted dot data.

BRIEF DESCRIPTION OF THE DRAWINGS

FIGS. 9 and 10 are diagrams explanatory of the second operation mode of the system shown in FIG. 1;

FIG. 12 is a diagram explanatory of the third operation mode of the system shown in FIG. 1;

DESCRIPTION OF THE PREFERRED EMBODIMENTS

Figure 1:
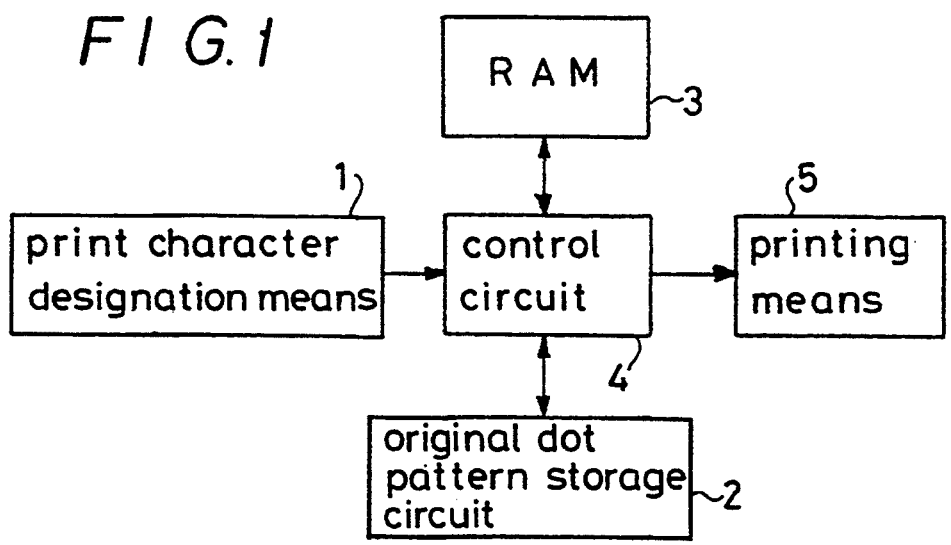
FIG. 1 is a block diagram showing a system according to the present invention.

Embodiments of the present invention will now be described with reference to the drawings. In FIG. 1, 1 is a print character designating means such as a personal computer, 2 is an original dot pattern storage circuit comprised of a font ROM in which the dot data representative of a plurality of original dot patterns showing letters, numerals, symbols and the like is stored, 3 is a RAM for temporarily storing both the dot data representative of an original dot pattern read from the original dot pattern storage circuit 2 and the dot data representative of a secondary dot pattern obtained by converting the original dot pattern in accordance with a given algorithm, 4 is a control circuit for reading the dot data from the original dot pattern storage circuit 2, converting the pattern of the original dot pattern, controlling printing, and so on, and 5 is a printing means comprising a print head or the like for performing printing on the basis of the dot data stored in the RAM 3.

When high-speed printing is to be performed, a mode switch (not shown) is turned to select a high-speed print mode, and then the print character designating means 1 is operated to designate print characters. Upon designation of the print character, the dot data representative of an original dot pattern corresponding to the designated print character is read from the original dot pattern storage circuit 2, the original dot pattern is converted in pattern in accordance with a given algorithm by the control circuit 4, and is stored in the RAM 3. Then, printing is performed by the printing means 5 on the basis of the dot pattern stored in the RAM 3.

Figure 2:
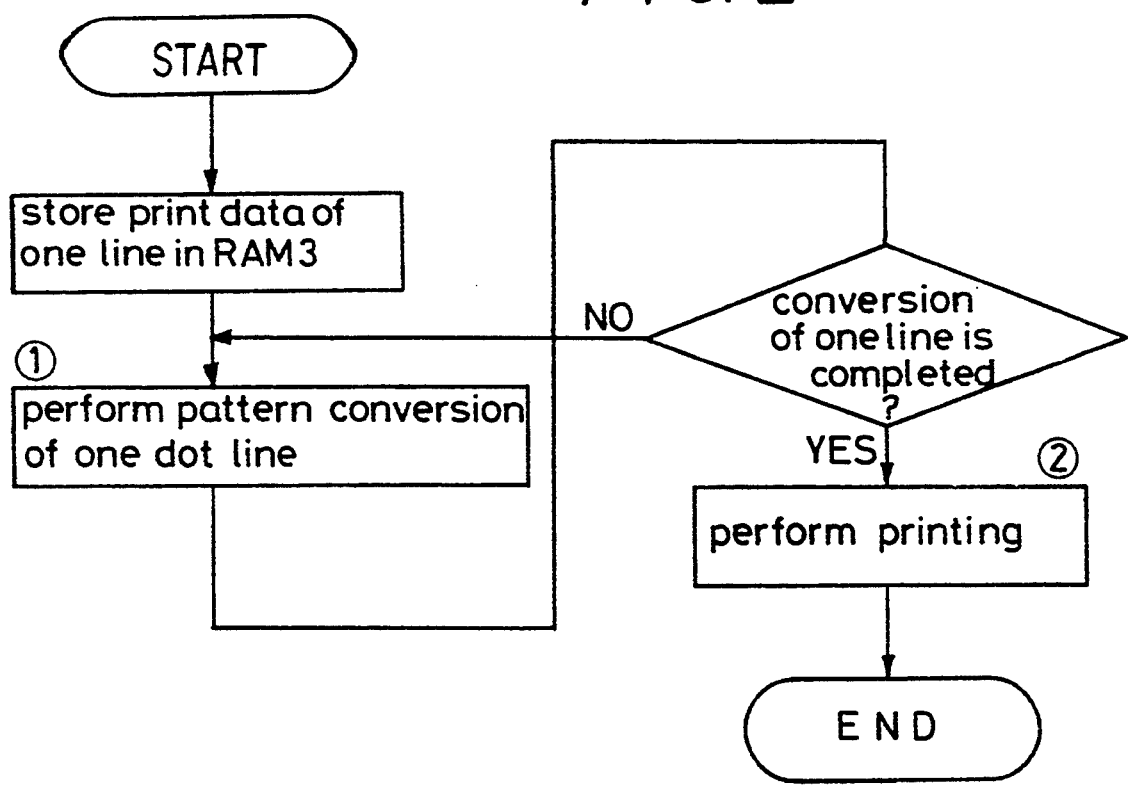
FIG. 2 is a flowchart showing a first operation mode of the system shown in FIG. 1.

A first embodiment of the process of converting the pattern of the original dot pattern by the control circuit 4 will now be described with reference to the flowchart of FIG. 2.

Figure 3:
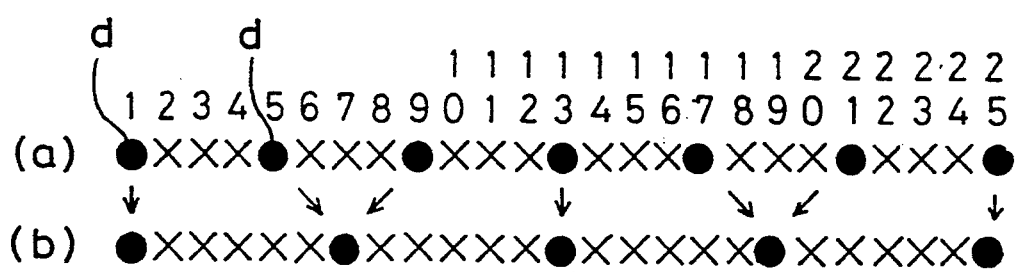
FIG. 3 is a diagram explanatory of the first operation mode of the system shown in FIG. 1.

Assume that the dot data representative of one dot line of the original dot pattern, corresponding to the designated character and read from the original dot pattern storage circuit 2, is stored in the RAM 3 in developed form as shown in FIG. 3(a) so that the 1st, 5th, 9th ... dot positions have individual dots d ... d. With respect to the dot data, first, a check is made to determine whether or not a dot is present at the first dot position. When a dot is present, it is retained there. Then, a check is made to determine if dots are present at the subsequent two dot positions (5th and 9th dot positions). When a dot is present at at least one of the two dot positions, a dot is generated at the middle position between the two dot positions. In this way, three dots are converted into two dots. The foregoing processing is repeated with respect to subsequent dots, so that the original dot pattern of one dot line shown in FIG. 3(a) is converted into the arrangement of FIG. 3(b) whose dot interval is 1.5 times longer (step 1).

When the pattern of all dot lines is converted entirely, the print head is scanned on the basis of the thus converted dot data at a speed 1.5 times faster than usual, so that printing elements such as printing wires are driven at the maximum response frequency of the usual printing (step 2).

In this way, letters and the like designated by the print character designating means 1 are printed at a speed 1.5 times faster than usual.

Figure 4:
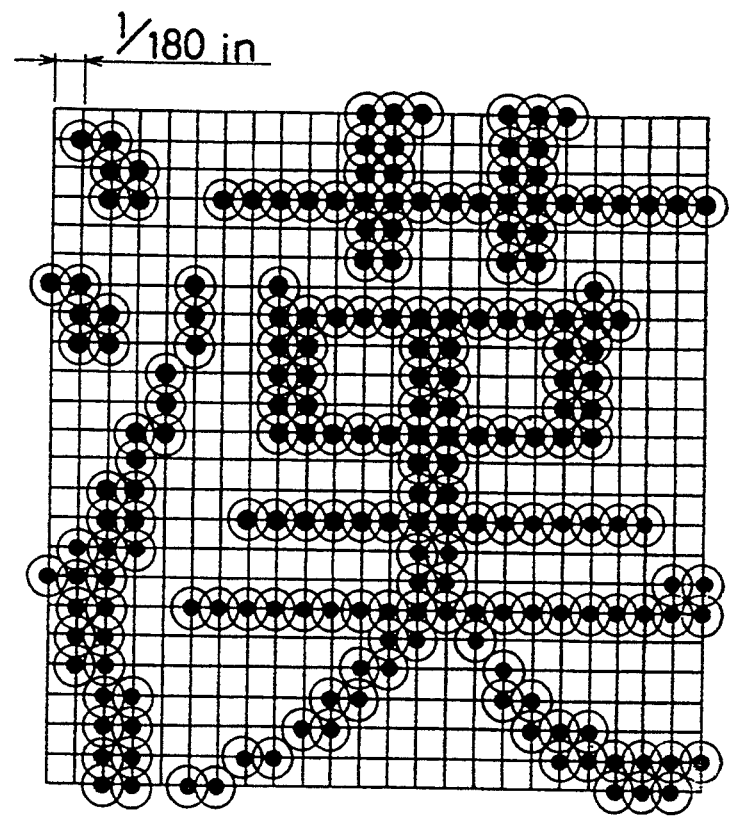
FIG. 4 is a diagram showing a printed example based on an original dot pattern.
Figure 5:
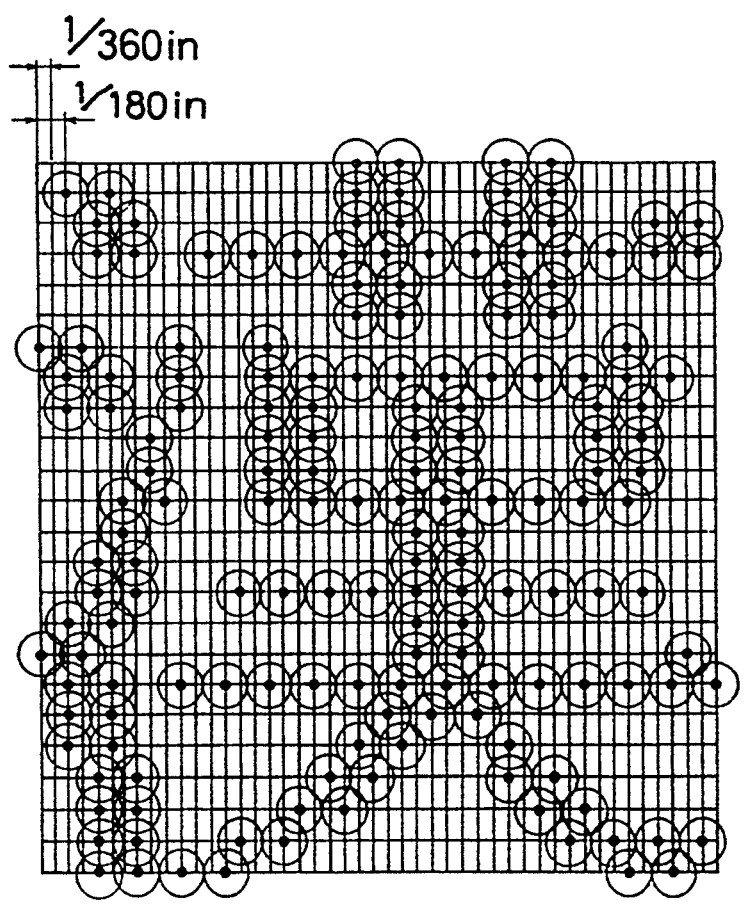
FIG. 5 is a diagram showing a printed example based on the first embodiment.

FIG. 4 shows a printed example based on the original dot pattern, and FIG. 5 shows a printed example based on the secondary dot pattern obtained by converting the original dot pattern in accordance with the first embodiment.

Figure 6:
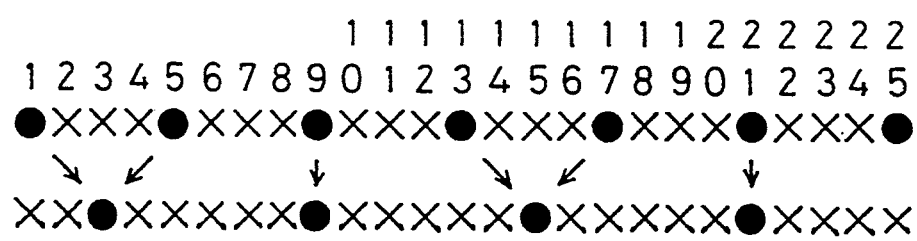
FIGS. 6 and 7 are diagrams explanatory of the first operation mode of the system shown in FIG. 1.

Although the first embodiment converts the pattern starting with the process of retaining a dot there, conversion may be performed starting with the process of generating a dot at the middle position between two successive dot positions as shown in FIG. 6.

Figure 7:
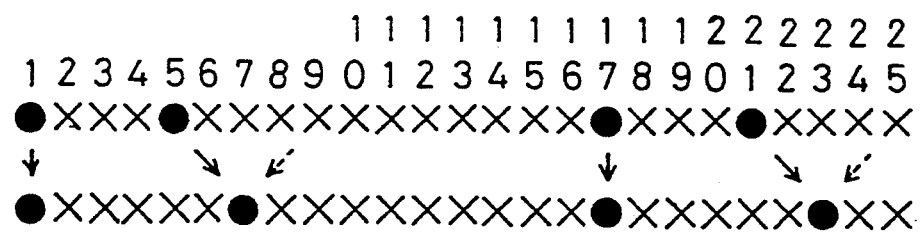

Although the first embodiment converts the pattern in such a manner that the first process of retaining a dot as it is and the second process of generating a dot at the middle position between two successive dot positions are alternated, conversion may be performed in such a manner that when one or more dot positions have no dot, a then-appearing dot is retained there, and when at least one of subsequent two dot positions has a dot, a dot is generated at the middle position between them as shown in FIG. 7.

Figure 8:
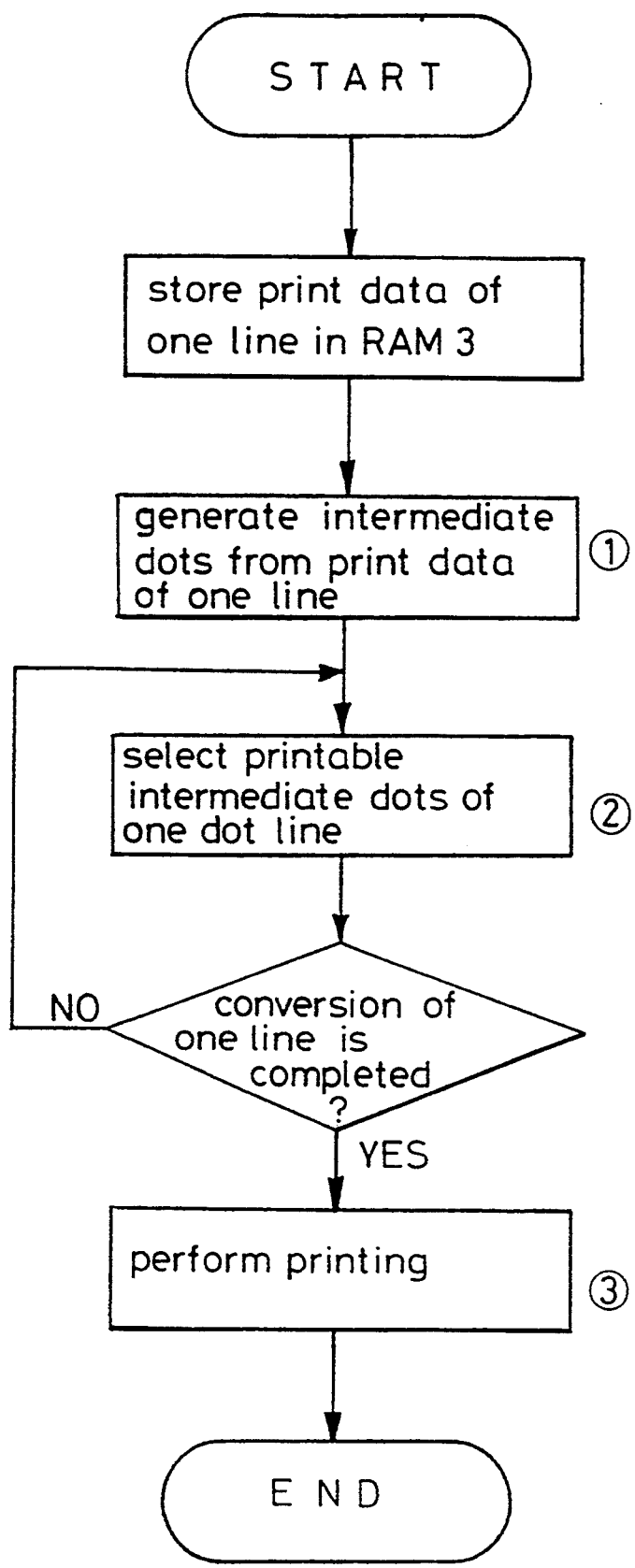
FIG. 8 is a flowchart showing a second operation mode of the system shown in FIG. 1.

A second embodiment of the, process of converting the original dot pattern by the control circuit 4 will be described with reference to the flowchart of FIG. 8.

Assume that the dot data representative of one dot line of the original dot pattern is stored in the RAM 3 in developed form as shown in FIG. 9(a). With respect to each dot, first, four intermediate dots are generated and stored successively (step 1) as shown in FIG. 9(b).

Then, only dots from the intermediate does that are present at dot positions spaced from the first dot position by an integral multiple of a dot interval 1.5 times longer than usual are selected, and the other intermediate dots are removed. As a result, successive dots from the dot data representative of one dot line shown in FIG. 9(a) are converted into those arranged at dot intervals of 1.5 times longer than usual (step 2). as shown in FIG. 9(c).

When the pattern of all dot lines is converted entirely, the print head is scanned on the basis of the thus-converted dot data at a speed 1.5 times faster than usual, so that the printing elements such as printing wires are driven at the maximum response frequency of usual printing (step 3).

In this way, letters and the like designated by the print character designating means 1 are printed at a speed 1.5 times faster than usual.

A printed example of the secondary dot pattern obtained by converting the original dot pattern shown in FIG. 4 in accordance with the second embodiment is identical with the printed example of the first embodiment shown in FIG. 5.

Figures 9, 10, 12:
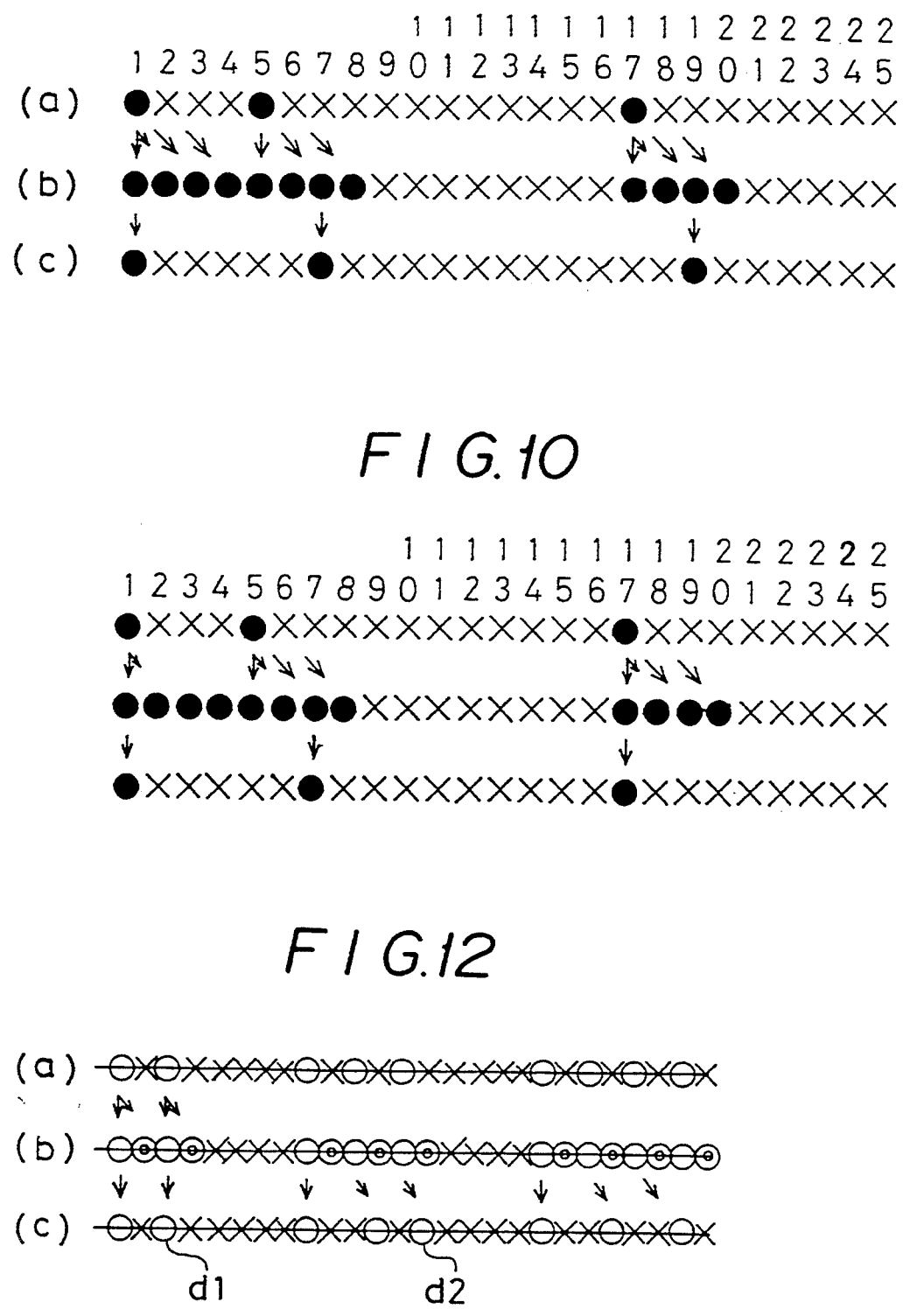

Although the second embodiment converts the pattern in such a manner that only dots out of the intermediate dots that are arranged at dot intervals of 1.5 times longer than usual are selected, conversion may be performed in such a manner that when no intermediate dot is present at some successive dot positions as shown in FIG. 10, a then-appearing intermediate dot is retained there, and only dots from the subsequent intermediate dots that are arranged at dot intervals of 1.5 times longer than usual are selected.

Although the processes described above with reference to FIGS. 9 and 10 select dots arranged at dot intervals of 1.5 times longer than usual, dots arranged at dot intervals of 1.25 or 1.75 times longer than usual may be selected. For example, in FIG. 9, every 5th intermediate dot may be selected instead of every 6th intermediate dot; in this case, the scanning speed of the print head is increased to 1.25 times faster than usual so that printing can be attained at a speed 1.25 times faster than usual. Similarly, every 7th intermediate dot may be selected instead of every 6th intermediate dot; in this case, the scanning speed of the print head is increased to 1.75 times faster than usual so that printing can be attained at a speed 1.75 times faster than usual.

Although each of the foregoing embodiments converts one dot into four successive intermediate dots, by giving an adequate storage capacity to the RAM 3, one dot can be converted into n (n≧2) intermediate dots; in this case, when there are 2n or moire successive intermediate dots, by selecting every m $\{(2n-1) \geq m \geq (n+1)\}$-th intermediate dot and increasing the scanning speed of the print head to K (1<K<2) times, preferably K=m/n, printing can be attained at a speed of K times faster.

Figure 11:
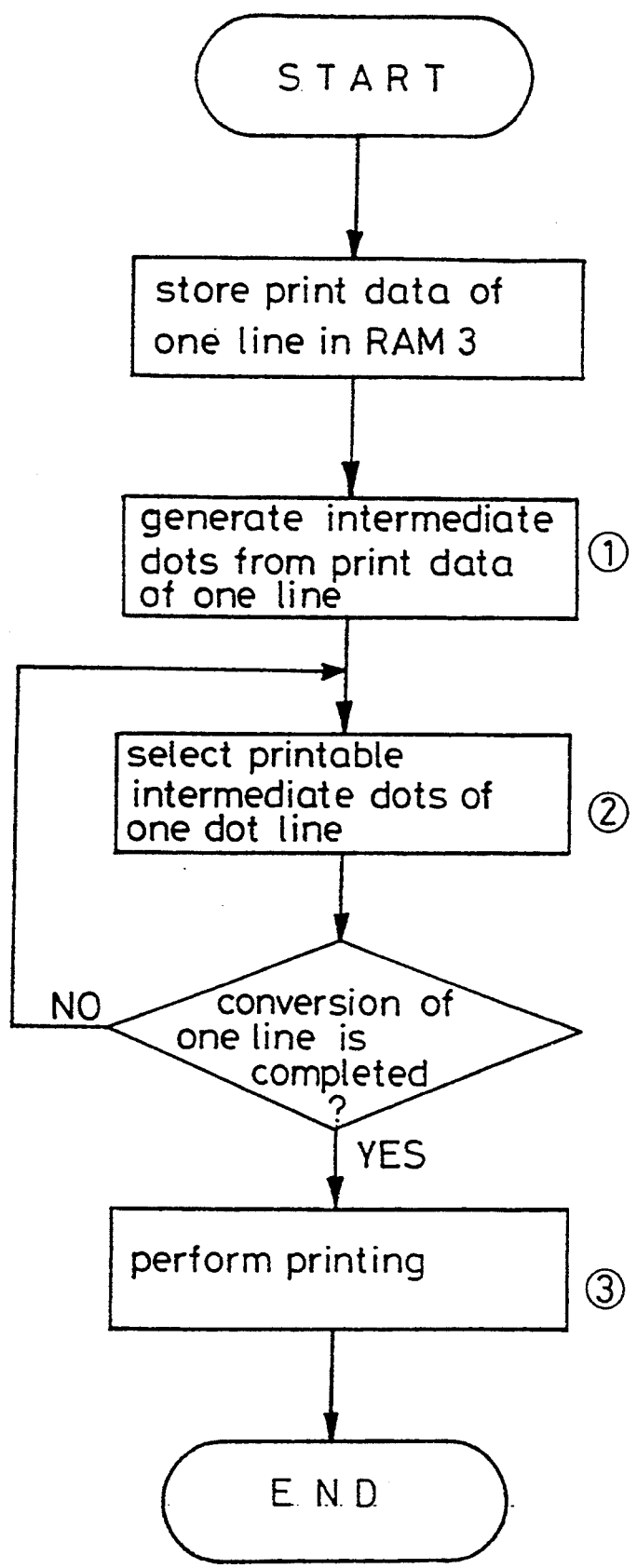
FIG. 11 is a flowcharg showing a third operation mode of the system shown in FIG. 1.

A third embodiment of the conversion of the pattern of the original dot pattern by the control circuit will now be described with reference to the flowchart of FIG. 11.

Generally, the maximum response frequency of the printing elements such as wire pins is determined by the condition that all dots of one line are successively printed, and the usual scanning speed of the print head is determined such that the character will be printed optimally when the printing elements are driven at that maximum response frequency. Practically, however, where only two or three successive dots are to be printed, the printing elements can be driven at a response frequency higher than the maximum response frequency. This embodiment is based on the assumption that the printing means 5 can print the last one of successive dots, i.e. two successive dots, at a response frequency 1.5 times higher than usual, and intends to improve the printing quality by making use of the foregoing property.

Assume that the dot data representative of one dot line of the original dot pattern is stored in the RAM 3 in developed form as shown in FIG. 12(a). First, each dot is converted to two successive intermediate dots (step 1) as shown in FIG. 12(b).

Then, the first intermediate dot is selected, and a check is made to determine whether or not the number x of successive intermediate dots subsequent to the thus selected dot meets the condition: $n \leq x \leq 2n-1$ (n is the number of intermediate dots generated on the basis of one original dot; n=2 in this example). When the condition is fulfilled, i.e. when there is only one dot which can be successively selected, printing can be performed at a response frequency of 1.5 times higher than usual; therefore, a dot present at a dot position spaced from the first dot position by the same dot interval as that of the original dot pattern (a dot d1 in FIG. 12(c)) is selected. On the other hand, when $x \geq 2n$, i.e. when there are two or more dots which can be successively selected, since the usual response frequency is used for driving, intermediate dots present at dot positions spaced from each other by a dot interval 1.5 times longer than usual (a dot d2 in FIG. 12(c)) are selected. In this way, all dots except the thus selected dots are removed; consequently, the dot data representative of one dot line shown in FIG. 12(a) is converted into the arrangement of FIG. 12(c) (step 2).

When the pattern of all dot lines is converted entirely, the print head is scanned on the basis of the thus converted dot data at a speed 1.5 times faster than usual, so that the printing elements such as printing wires are driven at the maximum response frequency of usual printing, or at a response frequency 1.5 times higher than the maximum response frequency, to attain print (step 3).

In this way, letters and the like designated by the print character designating means 1 are printed at a speed 1.5 times faster than usual.

Figure 13:
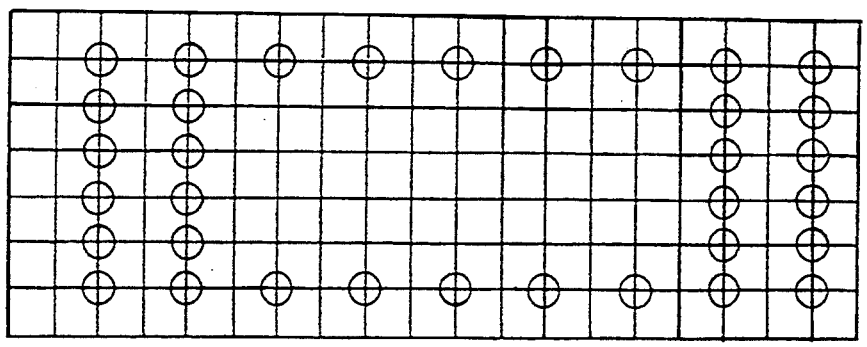
FIGS. 13 and 14 are diagrams each showing original dot patterns, printed examples based on the second embodiment, and printed examples based on the third embodiment, respectively.
Figure 13:
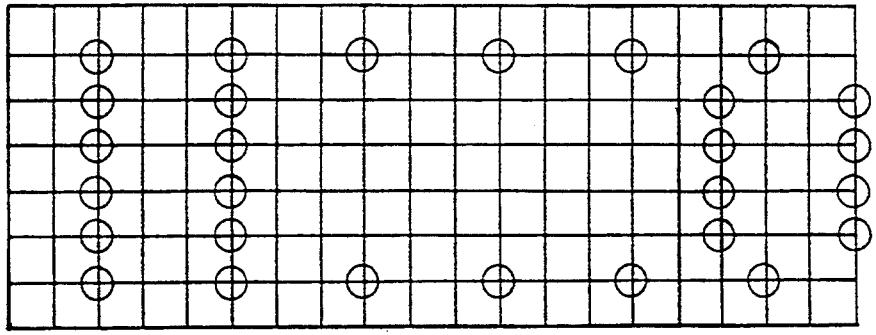
Figure 13:
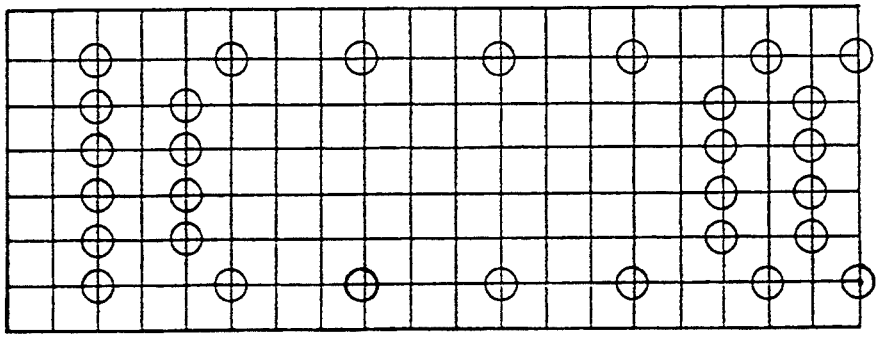

For illustrative purposes, FIG. 13(a) shows an original dot pattern, (b) shows a secondary dot pattern obtained by converting the original dot pattern (a) in accordance with the second embodiment, and (c) shows a secondary dot pattern obtained by converting the original dot pattern (a) in accordance with the third embodiment. The secondary dot pattern (b) has bold vertical lines as compared with the original dot pattern (because the dot interval is increased to 1.5 times) and its right upper and lower portions are slightly distorted; but, such points are improved in the pattern (c), or the pattern (c) is closer to the original dot pattern.

Figure 14:
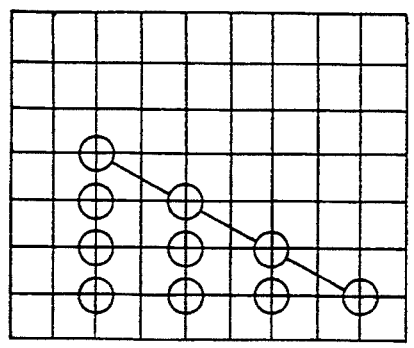
Figure 14:
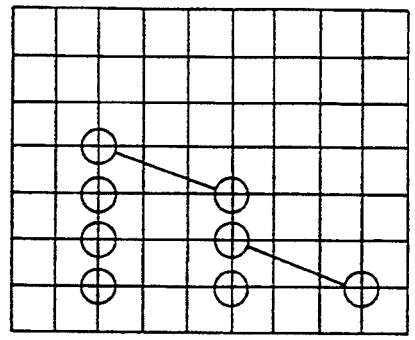
Figure 14:
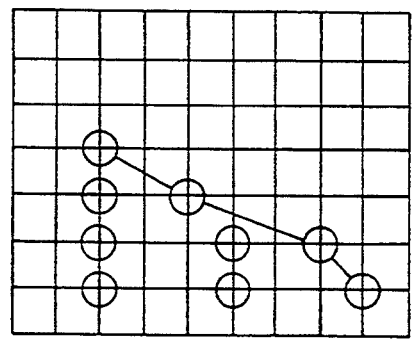

Further, FIG. 14(a) shows an original dot pattern, (b) shows a secondary dot pattern obtained by converting the original dot pattern (a) in accordance with the second embodiment, and (c) shows a secondary dot pattern obtained by converting the original dot pattern (a) in accordance with the third embodiment. The secondary dot pattern (b) has distorted oblique lines as compared with the original dot pattern; but, such points are improved in the pattern (c), or the pattern (c) has smooth oblique lines as is the case of the original dot pattern.

Figures 15, 16:
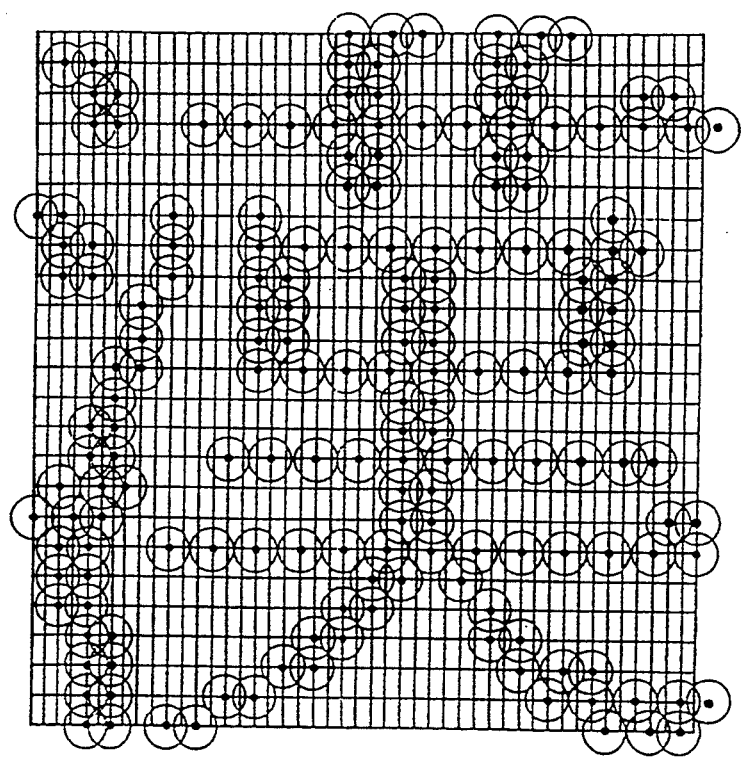
FIG. 15 is a diagram showing a printed example based on the third embodiment.
FIG. 16 is a diagram explanatory of the third operation mode of the system shown in FIG. 1.

FIG. 15 shows a printed example of a secondary dot pattern obtained by converting the original dot pattern shown in FIG. 4 in accordance with the third embodiment.

Although the third embodiment converts each dot of the original dot pattern to two intermediate dots, as shown in FIGS. 16(a) and (b), each dot of the original dot pattern may be converted to four intermediate dots. In this case, as shown in FIG. 16(c), in response to the maximum response frequency of the printing elements attained in successive dot printing of short period, only dots out of successive intermediate dots that are present at dot positions spaced from the first dot position by an integral multiple of a dot interval 1.25 or 1.75 times longer than usual are selected. When the number x of successive intermediate dots subsequent to the thus selected dot meets the condition: $n \leq x \leq 2n-1$ (n=4 in this example), a dot present at a dot position spaced from that dot position by the same dot interval as that of the original dot pattern is selected. Consequently, it is possible to attain printing at a speed 1.25 or 1.75 times faster than usual by increasing the scanning speed of the print head to 1.25 or 1.75 times faster than usual.

Although the third embodiment makes it possible for the printing means 5 to print two successive dots at a response frequency higher than the usual maximum response frequency, it is also possible to print three or more successive dots at a response frequency higher than the usual maximum response frequency. For this purpose, proper intermediate dots compatible with such performance will be selected.

Although each of the foregoing embodiments stores the dot data representative of one line in the RAM 3 in developed form, the dot data representative of one character may be stored.

Although each of the foregoing embodiments converts the pattern after storing the dot data representative of the original dot pattern in the RAM 3 in developed form, conversion may be performed while the dot data representative of the original dot pattern is being read from the original dot pattern storage circuit 2; in this case, only the dot data representative of the coverted dot pattern may be stored in the RAM 3 in developed form, According to the present invention, the printing speed can be increased with little deterioration in printing quality, The invention makes it possible to print the original dot pattern in the form of a dot pattern closer thereto with little degradation of the printing quality.

What we claim is:

1. A method for printing wherein a printhead is successively scanned in a line direction to print a plurality of dots extending in said line direction and a recording medium is fed at right angles to said line direction, comprising the steps of:

receiving original dot data representative of a given line, in said line direction, of an original dot pattern including fonts, graphics and the like, having individual original dots separated from a preceding individual original dot by a minimum interval $d_1$;

converting said original dots, of said dot data in said given line, into $n(n \geq 2)$ successive dots of secondary dot data, wherein n is an integer and each successive dot is separated by a secondary interval being equal to $d_1/n$;

selecting desired dots of said secondary dot data in the line direction, wherein said desired dots having an interval $d_1$ or $d_2$ between said desired dots, wherein $d_2 = d_1 \times m/n$ and $m > n$;

scanning the printhead at a sped faster than a speed attained when the original dot pattern is printed;

printing in the line direction using the thus selected desired dots driving a printing element of the printhead at a shorter cycle rate than used to print said original dot data in response to a predetermined number of successive ones of said desired dots; and driving the printing element at a cycle rate equal to that used to print said original dot data in response to remaining successive ones of said desired dots.

2. A method for printing wherein a printhead is successively scanned in a line direction to print a plurality of lines extending in said line direction and a recording medium is fed at right angles to said line direction, comprising the steps of:

receiving dot data representative of dots of a given line of said plurality of lines extending in said line direction of an original dot pattern having fonts, graphics and the like, wherein individual original dots are separated from a preceding individual original dot in said line direction by a minimum interval;

converting the pattern of said original dot pattern in the line direction by converting said dots of said dot data into n dots of converted dot data in the line direction, wherein n is an integer;

arranging said dots of said converted dot data successively from a first dot data position with an interval 1/n times the original dot data interval and selecting desired dots of said converted dot data, at least a portion of which are separated by an interval greater than said minimum interval, while retaining a relative pattern density substantially the same as that of said original dot pattern;

scanning the printhead at a speed faster than the moving speed attained when the original dot pattern is printed; and printing using the thus selected dot data in the line direction, the driving cycle of a printing element, in response to a predetermined number of successive dots of said selected dot data, being shorter than the driving cycle of a printing element when printing an original dot pattern, and the driving cycle of a printing element, in response to remaining successive dot data of said selected dot data, being the same as the driving cycle of a printing element when printing the original dot pattern.

3. A printing method for use with a dot printer comprising the steps of:

receiving scanned lines of original dot data representative of an original dot pattern;

printing at a scan speed faster than the moving speed of a printhead along a scan direction attained when the original dot pattern is printed by pattern converting the original dot pattern;

said pattern converting including:

converting each dot of the original dot pattern, in an individual one of said plurality of scanned lines, into $n(n \geq 2)$ successive intermediate dots along said scan direction;

selecting only dots out of the intermediate dots that are arranged at the same dot interval in said scan direction as that of the original dot pattern over a zone where printing at original dot density is possible at the faster scan speed, and in another zone, selecting every $m_{th}$ intermediate dot $(2n-1 \geq m \geq n+1)$, thereby reducing a density of said dots in said scan direction to permit said faster scan speed.

4. A method for printing characters, graphics or the like by means of a dot printer having a printhead movable for scanning in a line direction relative to a recording medium, said method comprising the steps of:

receiving original dot data which represents an original dot pattern having dots provided in said line direction while keeping a distance $d_1$ between said dots in said line direction;

converting the original dot pattern by converting each original dot data into $n(n \geq 2)$ successive secondary dot data in said line direction, wherein n is an integer and each successive dot is separated by a secondary interval being equal to $d_1/n$;

selecting desired secondary dot data of which a dot data interval is equal to or broader than the minimum interval of the original dot data in said line direction;

scanning the printhead at a speed $V_2$, which is faster than a scanning speed $V_1$, which is a scanning speed when printing is performed by the original dot pattern and printing the thus selected secondary dot data; and the distance between the printed dots, in said line direction using the selected secondary dot data, being equal to or broader than the distance $d_1$.

5. A method according to claim 4 wherein the distance between the printed dots using the selected secondary dot data is equal to $d_1$ or $d_2$, wherein $d_2 = d_1 \cdot V_2/V_1$.

6. A method for increasing a printing speed of a dot printer of the type in which a printhead is successively scanned across a recording medium in a scan line direction to produce a plurality of scan lines of dot data, said recording medium is fed incrementally at right angles to said scan line direction upon completion of a successive scanning across said recording medium by said printhead, and each of said plurality of scan lines of dot data is made up of a row of individual dots formed by driving at least one printing element disposed in said printhead as said printhead is scanned across said recording medium, comprising the steps of:

receiving a scan line of original dot data including a plurality of individual original dots, wherein each of said individual original dots is separated from a preceding individual original dot in said row by a minimum interval $d_1$;

converting said scan line of original dot data into intermediate dot data by converting each of said individual original dots into intermediate dot segments each comprised of n successive intermediate dots wherein a first intermediate dot in each of said intermediate dot segments occupies a position of each of said individual original dots, and each successive intermediate dot in each of said intermediate dot segments is separated from a preceding intermediate dot by an intermediate interval equal to $d_1/n$, wherein $n \geq 2$ and n is an integer;

consecutive ones of said intermediate dots forming a group including at least one of said intermediate dot segments;

converting said intermediate dot data into secondary dot data including secondary dots separated by at least one of intervals $d_2$ and $d_3$, wherein $d_2 \geq d_1$, $d_3 > d_1$, and $d_3 > d_2$; and scanning said printhead to print said secondary data at a secondary speed $V_2$, said secondary speed being greater than an original scanning speed $V_1$ when printing is performed by said original dot data.

7. The method according to claim 6, wherein said step of converting further includes:
  selecting an individual one of said successive intermediate dots occupying a first position in said group;
  determining a number x of remaining successive intermediate dots subsequent to a most recently selected one of said successive intermediate dots in each said group;
  selecting intermediate dote in said group occupying positions equivalent to said original dot data being offset from said most recently selected one of said successive intermediate dots by $d_2$, when $n \geq x \geq 2n-1$;
  selecting intermediate dots in said group occupying positions offset from said most recently selected one of said successive intermediate dots by $d_3$, when $x \geq 2n$; and
  wherein said secondary dot data includes intermediate dots selected in said steps of selecting.

8. The method according to claim 6, wherein $V_2/V_1 = d_3/d_1$.